(12) United States Patent
Chu et al.

(10) Patent No.: US 8,732,621 B2
(45) Date of Patent: May 20, 2014

(54) METHOD AND APPARATUS FOR INFORMATION VISUALIZED EXPRESSION, AND VISUALIZED HUMAN COMPUTER INTERACTIVE EXPRESSION INTERFACE THEREOF

(75) Inventors: Shixian Chu, Lafayette, LA (US);
Jinfeng Chen, Lafayette, LA (US);
Zonghuan Wu, Lafayette, LA (US);
Chee-Hung Henry Chu, Lafayette, LA (US); Vijay V Raghavan, Lafayette, LA (US)

(73) Assignee: Senovation, L.L.C., Lafayette, LA (US)

( * ) Notice: Subject to any disclaimer, the term of this patent is extended or adjusted under 35 U.S.C. 154(b) by 930 days.

(21) Appl. No.: 12/864,501

(22) PCT Filed: Jan. 23, 2008

(86) PCT No.: PCT/CN2008/000168
§ 371 (c)(1),
(2), (4) Date: Sep. 27, 2010

(87) PCT Pub. No.: WO2009/094800
PCT Pub. Date: Aug. 6, 2009

(65) Prior Publication Data
US 2011/0029933 A1   Feb. 3, 2011

(51) Int. Cl.
*G06F 3/048*   (2013.01)
(52) U.S. Cl.
USPC .......................................... 715/854; 715/855
(58) Field of Classification Search
USPC ......................................... 715/854, 764, 855
See application file for complete search history.

(56) References Cited

U.S. PATENT DOCUMENTS

| 7,334,195 B2 | 2/2008 | Gemmell |
| 7,502,786 B2 | 3/2009 | Liu |
| 7,698,657 B2 | 4/2010 | Gemmell |
| 8,214,764 B2 | 7/2012 | Gemmell |

(Continued)

FOREIGN PATENT DOCUMENTS

| CN | 200610026252.7 | 6/2006 |
| CN | 200610001267.8 | 7/2007 |

OTHER PUBLICATIONS

PCT—International Searching Authority, "Written Opinion of the International Searching Authority for International Application No. PCT/CN2008/000168", mailed Nov. 6, 2008 (3 pages).

(Continued)

*Primary Examiner* — Omar Abdul-Ali
(74) *Attorney, Agent, or Firm* — Silicon Valley Patent Group LLP; Venkatesh Krishnamoorthy

(57) ABSTRACT

A method, interface, and apparatus for expressing data objects is described. A method for expressing information can comprise the steps of: extracting attributes of a plurality of data objects, wherein the attributes reflect information associated with the data objects; hierarchically grouping the data objects based on the attributes of the data objects to form a hierarchical data object structure; establishing basic representation units, wherein each basic representation unit is described using multimedia attributes and each unit corresponds to at least one data object; establishing a multi-dimensional mapping relationship between distinct attributes of a subset of the data objects that correspond to each basic representation unit and the multimedia attributes used to describe that unit and displaying the basic representation units to reflect the hierarchical grouping of the data objects on a multimedia display device, wherein the mapping relationship is used to determine the multimedia attributes of the basic representation units.

13 Claims, 9 Drawing Sheets

(56) References Cited

U.S. PATENT DOCUMENTS

| | | |
|---|---|---|
| 8,260,771 B1 * | 9/2012 | Ortega et al. ............... 707/723 |
| 2005/0080769 A1 | 4/2005 | Gemmell |
| 2005/0144158 A1 * | 6/2005 | Capper et al. ............... 707/3 |
| 2007/0011146 A1 * | 1/2007 | Holbrook .................... 707/3 |
| 2007/0162443 A1 | 7/2007 | Liu |
| 2008/0059899 A1 | 3/2008 | Gemmell |
| 2008/0222145 A1 | 9/2008 | Liu |
| 2009/0012841 A1 * | 1/2009 | Saft et al. ................... 705/10 |
| 2010/0106752 A1 * | 4/2010 | Eckardt et al. ............. 707/805 |

OTHER PUBLICATIONS

PCT—International Preliminary Report on Patentability, "International Preliminary Report on Patentability for International Application No. PCT/CN2008/000168", issued Jul., 27, 2010 (4 pages).

* cited by examiner

300

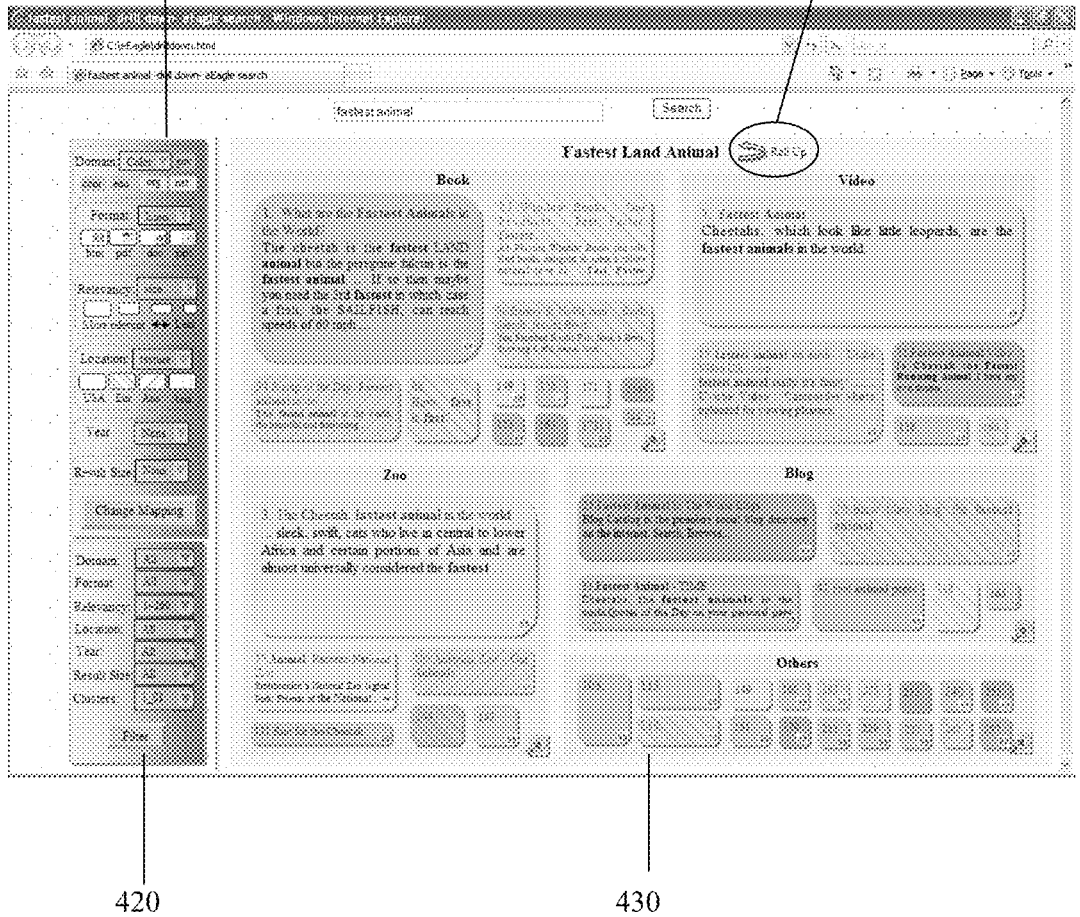

METHOD AND APPARATUS FOR INFORMATION VISUALIZED EXPRESSION, AND VISUALIZED HUMAN COMPUTER INTERACTIVE EXPRESSION INTERFACE THEREOF

This application claims priority to International Application Number PCT/CN2008/000168 filed Jan. 23, 2008 in English by the same inventors and designating the United States.

TECHNICAL FIELD

The present invention relates generally to a method and apparatus for visualizing and expressing data and an interface for visualizing and expressing human computer interaction with that data, and more particularly to a method, interface, and apparatus for presenting, visualizing and expressing the attributes of the data objects, which may be massive in number, to reflect correlative information.

BACKGROUND ART

In our modern information age society, people acquire and deal with a mass of information, which may be represented by data objects, every day. People desire a tool to help them to intuitively, efficiently, and comprehensively grasp the mass of information represented by the data objects, along with an understanding of their attributes and correlations, since the time available for processing the mass of information is limited.

For example, to learn about a certain subject matter and the related information, it is a common measure for people to adopt various well-known Web search engines to obtain a mass of returned information. Typically, the results returned by a search engine, such as Google (http://www.google.com), are displayed on Personal Computer ("PC") screen, which often have display resolutions of 800×600 1280×1024 pixels, in a one-dimensional ranked index list. Each search result may be regarded as a data object and the user is able to browse through some of the data objects that comprise the search results, t, and see some of the related physical attribute information on a browser page.

As an example, FIG. 6 is a screenshot (1280×1024 pixels) of a display interface for search results returned by the conventional search engine Google, where only seven (7) results are displayed. The user has to operate buttons, mouse or other I/O devices to scroll up and down within the result page or go to a next page, in order to see more search results. Under these conditions, if the desired search result does not appear at the beginning of a ranked list, the time needed for a user to find the satisfying result is greatly increased. The search efficiency is even poorer when the satisfying result does not appear on the first page or in the first few result pages. This is because users often go through several pages of undesired results before a desired one is located. Such a process is also tedious, boring, unreliable and sometimes impractical.

Spatial constraints for presenting search engine results are greatly increased when using electronic devices with limited display surfaces, such as mobile phones, portable digital assistants, and other portable or small-screen electronic devices. In such situations, in order to see all return results for a query, the user often needs to repeatedly interact with the buttons, mouse or other I/O devices.

Some other search engines such as Kartoo (http://www.kartoo.com). Kartoo display a limited number of results comprising data objects using a graph, which merely reflects the relationships among the search results. Consequently, the efficiency of usage of interface space is low. In addition, since Kartoo fails to express the relationships between the rich attributes of data objects in a manner that enable the display of relationship information using multimedia expression methods. Further, because Kartoo also fails to provide a plurality of display methods and interfaces to facilitate human-computer interaction, it cannot satisfy the demand of intuitively, efficiently and comprehensively grasping the mass of information and attribute information thereof.

Another type of search engine, represented by Clusty (http://www.clusty.com), displays categorized information in a text-based, two-dimensional space but lacks a visual interface to express the categorized information. Such a search engine cannot satisfy the demand of intuitively, efficiently, and comprehensively grasping the attribute and correlative information in situations involving a massive number of data objects.

As for other electronic information retrieval systems, they generally return a mass of related data objects by a retrieval component, similar to that of a search engine, when the user inputs a query. The user usually has to analyze a large number of data objects, if not all of them, to find the most desired one(s). It is a laborious and time-consuming process.

All the current display methods for a mass of information exhibit one or more of the following common flaws: (1) they can only display a small number of data objects simultaneously. They can only display a small number of attributes of each data object simultaneously. They do not efficiently utilize the presentation capability of display screens of the devices. For instance, they can only display fewer than twenty search results and a few information attributes of the search results on an 800×600 pixel screen. (2) Because of the limited amount of displayed data objects and their attributes, current methods have no mechanism to intuitively, efficiently, and comprehensively provide the macroscopic information of the search results. Examples of such information are: the number of results from among the top 200 results that are from the U.S.; the number that are from China; the number that are from the domain "edu"; the number that are from the domain "edu" in the U.S. (3) The existing methods do not provide a user with interactive approaches to customize the management of search results beyond the basic operations such as going to another page based on the page number. (4) Because of the limitations of the number of information results and their data object attributes that can be simultaneously displayed and of the simplistic interactions provided, the current display methods cannot comprehensively and intuitively express the relationship among different result documents. For instance, two result documents ranked 12th and 68th might address the same topic, both came from an academic domain, but the result document ranked 12th was published on the Internet several years before the 68th ranked document. Such subtle, complex relationship cannot be expressed using the current display methods for the result information. (5) Current display methods for the result information do not use aural properties to express the attributes of and correlations among the result documents. (6) Because only a limited number of visual properties are used in presentation, current display methods lack the means to provide users with immersive interaction with search results.

From the discussion above, we can see that even though search engines or retrieval tools can assist a user by returning a large number of search results as well as the detailed result attributes, the limitations of existing display means for a mass of information significantly limit a user's ability to intuitively, efficiently and comprehensively grasping the massive number of data objects, their attributes and correlations among the said data objects, and thus prevent users from fully utilizing the rich information available in the result data objects.

DISCLOSURE OF INVENTION

In some embodiments, a method for expressing information may comprise the steps of: extracting attributes of a plurality of data objects, wherein the attributes reflect information associated with the data objects; hierarchically grouping the data objects based on the attributes of the data objects to form a hierarchical structure of data objects; establishing basic representation units, wherein the basic representation units can be described using multimedia attributes and each basic representation unit corresponds to at least one data object; establishing a mapping relationship between distinct attributes of a subset of the data objects that correspond to each basic representation unit and the multimedia attributes used to describe that basic representation units; and displaying the basic representation units to reflect the hierarchical grouping of the data objects on a multimedia device, wherein the mapping relationship is used to determine the multimedia attributes of the displayed basic representation units. Embodiments described also relate to apparatus and interfaces for multidimensional comprehensive expression of data objects, which can facilitate comprehension of the structure of a collection of multidimensional data objects.

BRIEF DESCRIPTION OF THE DRAWINGS

The above objects, features and advantages will become more apparent for those skilled in the art from the following description of various embodiments in conjunction with the accompanying drawings, in which:

FIGS. 4A-4B show examples of an expression interface obtained using the exemplary multi-dimensional, comprehensive display method illustrated in FIG. 3A.

DETAILED DESCRIPTION

The exemplary embodiments shown in the attached drawings are described below with reference to the accompanying drawings.

Embodiments described provide a multi-dimensional comprehensive expression method, visual interactive interfaces, and apparatus for expressing a mass of visualized correlative information and their data object attributes. Some of these methods, apparatus, and interfaces may be based on grouping the mass of information and adopting multi-dimensional attribute correlation in conjunct with multimedia video and audio techniques. The description refers to exemplary cases where a mass of information obtained by a Web search engines is considered in discussing embodiments of the present invention. However, the present invention is not limited to the examples discussed and situations described and may be used in variety of situations as would be apparent to one of ordinary skill in the art.

Figure 1:
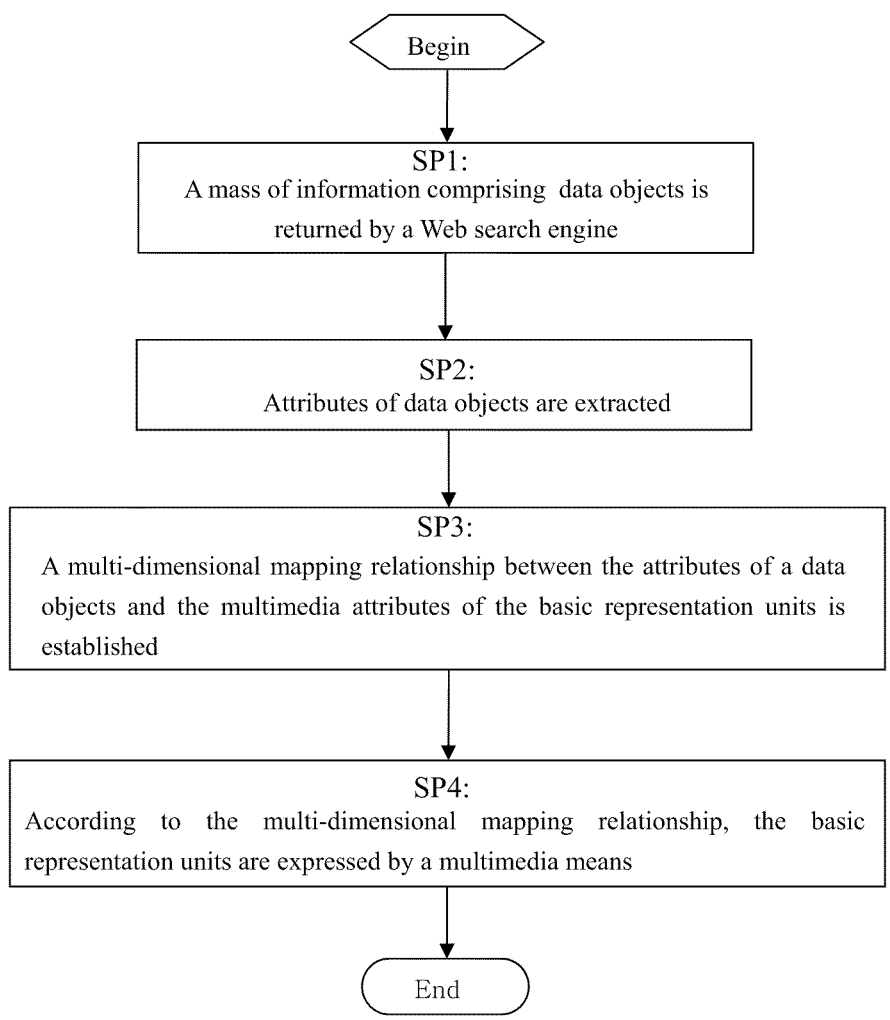
FIG. 1 is a flowchart illustrating an exemplary multi-dimensional, comprehensive expression method.

FIG. 1 is a flowchart illustrating a multi-dimensional, comprehensive expression method.

In step SP1, a mass of information including data objects reflecting said information may be returned by a search engine. The term "data object" adopted by the present application herein generally defines a basic unit of the information to be processed. In general, information can be seen as an aggregation of a number of basic information units. For example, if the information to be processed is a set of electronic documents, each document is one data object. In the context of a search engine, for example, where search results of a search engine are being expressed, each search result may represent one data object.

In the step SP2, attributes of data objects are extracted from the data objects. Generally, the attributes of data objects comprise physical attributes and logical attributes. Then, the data objects are classified according to their physical attributes or logical attributes.

The grouping of data objects can be based on values of different attributes such as the domain (such as "edu", "gov" "com etc) associated with the data object, document formats (such as "PDF" "doc" etc.) associated with the data object, geographical location of the data object, themes associated with the data object, and so on. Descriptions for details of the extraction and classification techniques, which are well-known and would be apparent to one of ordinary skill in the art, are omitted herein.

A search engine returns data objects that possess physical and logical attributes. A data object's physical attributes include inherent properties such as the publication date, domain, format, geographical location, Internet Protocol address, size, title and abstract and so on. The physical attribute is inherent for the data objects, and can be acquired relatively easily. For example, the physical attributes of a data object such as a webpage include the type of the webpage (HTML, PDF, DOC etc.), the size of the webpage document, the issue time of the webpage document, the IP address of the webpage document, the domain, and the like. The data objects can be classified according to their physical attributes. For example, the classes of the data objects based on domain include "edu", "com", "net", "org", "gov" and so on.

The logical attributes of a data object include the document-query correlations, document-document correlations and thematic classifications of the information content. The document-query correlation refers to the satisfaction degree of the search result. Conventional search engines, such as Google, list the search results according to the sequence from high correlation to low correlation. Various logical attributes of the embodiments herein are described such as the document-document correlation and the thematic classification of the information content. The data objects can be grouped according to their logical attributes. Embodiments are described in terms of two kinds of grouping algorithms, which are based on the logical attributes of the data objects. The first kind are clustering algorithms, which group data objects based on the degree to which there is correlation between the content of data objects i.e. the correlation degree of the content of the data object. Clustering algorithms may place documents containing similar content in the same cluster. The second kind of grouping algorithms are classification algorithms, which group data objects according to themes in the information content. Classification algorithms may place documents with some specified thematic content in the same cluster. For example, data objects about the theme "fastest animal" can be classified based on the themes "fastest land animal", and "fastest marine animal". The data objects can be grouped into a plurality of nested groups based on their document attribute, so that a main class can be further divided into sub-groups in a hierarchical fashion. Finally a hierarchical grouping structure is formed. Each group and sub-group can have its own title, which is a key word or phrase that best represents the group and sub-group. For example, the hierarchy represented by: animal—catamount—big catamount—tiger.

Then the process goes to step SP3. In the step SP3, a multi-dimensional mapping relationship between the, which indicates the relationship between one or more attributes of a data object and one or more multimedia attributes that are associated with the basic representation unit is established.

In some embodiments, a polygon or polyhedron (triangle, quadrangle, and hexahedron etc., hereinafter referred to as a 'block') may be used as a basic representation unit to represent a search data object on a screen. Other plane graphic objects and/or solid graphic objects can also be used as basic representation units. In FIGS. 2A-2B and FIGS. 4A-4B, the geometrical shape of a block is rectangular.

In some embodiments, basic representation units may have multimedia attributes. The multimedia attributes of a basic representation unit can include visual and aural attributes. In some embodiments, each block may have specific visual and aural attributes, which may be distinct from those of other blocks. Examples of a block's visual attributes are, without limitation, as follows: position, size, color, shape, intensity, texture, animation, the shading, three-dimensional effect, and the text attributes on the block etc. The text attributes include the text content, the typeface, font size, font color, font intensity, font texture, font animation, font shading and the font three-dimensional effects etc. Examples of a block's aural attributes, without limitation, are as follows: tone, volume, rhythm, melody, and the content of the tune etc.

In some embodiments, the mapping of different multimedia attributes of the basic representation unit to the attributes of a data object can be modified based on the user's favorite arrangement or based on a default predetermined mapping association.

The multi-dimensional mapping can relate one or more multimedia attributes to one or more attributes of data objects and refers to which multimedia attribute is used to represent which attribute of data objects. In some embodiments, the mapping may associate a specific data object attribute with a specific multi-media (visual, aural, etc.) of the basic representation unit. There are obviously a lot of mapping schemes. A default scheme can be set. However, users can modify the mapping schemes according to preferences and design their favorite scheme.

Then the process goes to step SP4. In the step SP4, the basic representation units, which represent the information and the attributes of the data objects, and the multi-dimensional mapping relationship among the said data objects, may be expressed by using multimedia techniques such as display screens and audio devices such as speakers on the computer.

In some embodiments, the blocks representing a plurality of data objects can be tightly placed on the expression interface to optimally utilize the space available, while expressing the corresponding mass of viewable correlative information and the attribute information associated with said mass of viewable correlative information.

In some embodiments, multi-dimensional, comprehensive expression methods take advantage of basic representation units including multimedia attributes of the basic representation units to intuitively express structural relationships between data objects, such as a hierarchical classification of information. Therefore, the multi-dimensional, comprehensive expression methods consistent with disclosed embodiments may be capable of providing information expression for a large volume of data objects relative to screen or display size: for example, the relationships between hundreds of documents can be clearly expressed on an 800×600 pixel screen. Not only can this capacity enhance the speed by which a user conducts a search and grasps the general information of the search data objects, it can enable a user to understand the structure of information in a field of knowledge.

Figure 2A:
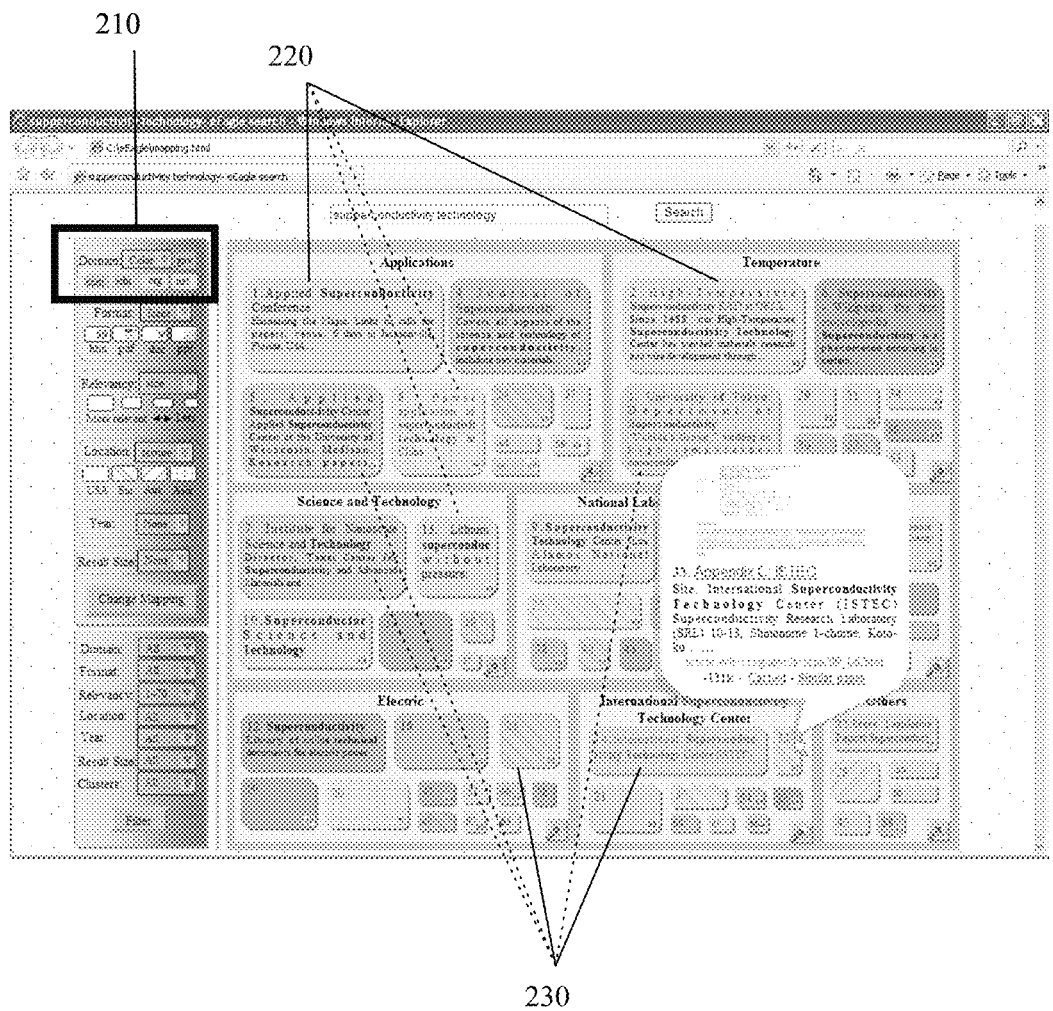
FIGS. 2A and 2B respectively show an example of a display interface obtained using the multi-dimensional comprehensive expression method.
Figure 2B:
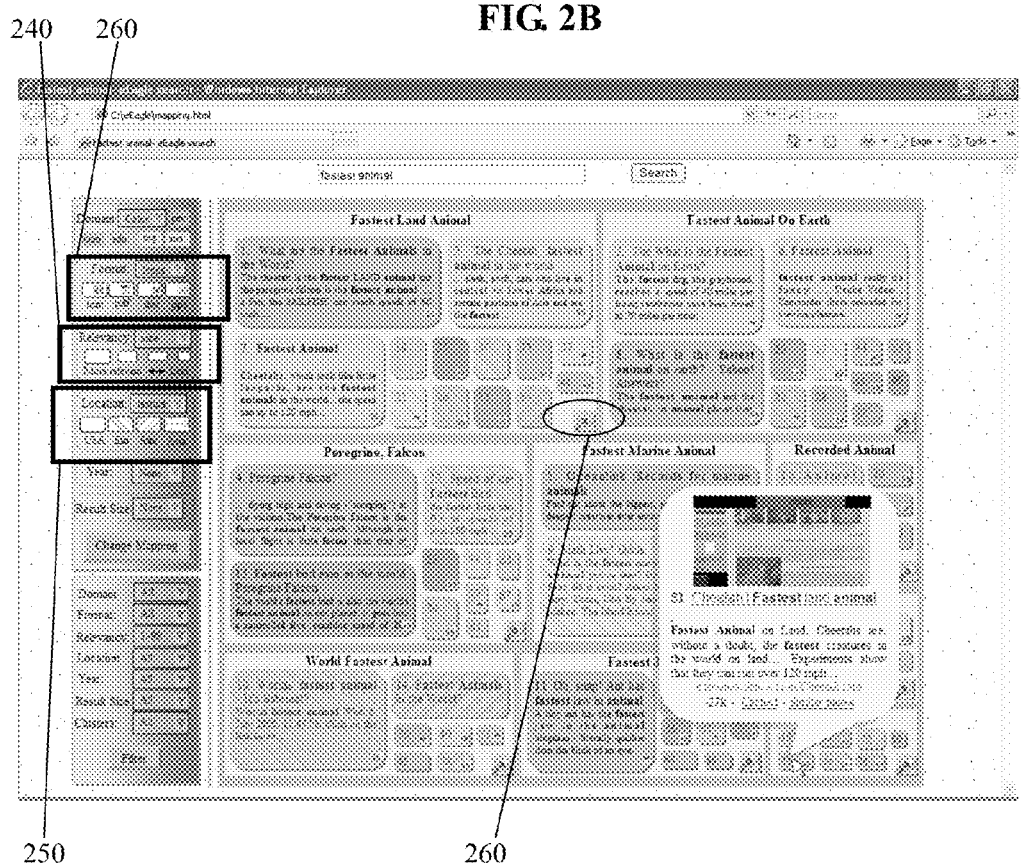

FIGS. 2A and 2B respectively show an example of an expression interface obtained using the exemplary multi-dimensional comprehensive expression method in FIG. 1.

FIG. 2A shows an exemplary interface for the query term 'superconductivity technology' obtained using the multi-dimensional, comprehensive expression method in FIG. 1.

In one embodiment, as shown in mapping 210 in FIG. 2A, a block's color can be mapped to the document's domain, for example by using distinct colors for each domain such as the color pink for "edu", the color green for "org", the color blue for "com", and so on.

The search returns with blocks that are predominantly in colors pink 230 and green 220, with very few exceptional blue blocks. The user can see that most results are from the "edu" (pink) or "org" (green) domains, and that only a few results are from "com" domain, which may be used to infer that 'superconductivity technology' is basically still at the scientific research stage, and has not reached the stage of commercial exploitation.

FIG. 2B shows an exemplary expression interface for the query term 'fastest animal' obtained using the exemplary multi-dimensional, comprehensive expression method in FIG. 1.

For example, we can map a block's color to the document's domain attribute by using the different colors to represent the domains "edu," "org," and "com," etc. respectively as described with respect to FIG. 2A.

As shown in FIG. 2B, other mapping relationships can be established in the similar way. For example, mapping 240 for the attribute "document relevancy" maps "document relevancy" to block size. Similarly, mapping 250 for the attribute "document location" maps "document location" and mapping 260 maps the attribute "document format" to an icon within the block, and so on.

Users can utilize the visual representations of multi-dimensional mapping relationships in which desired documents stand out from others.

Figure 3A:
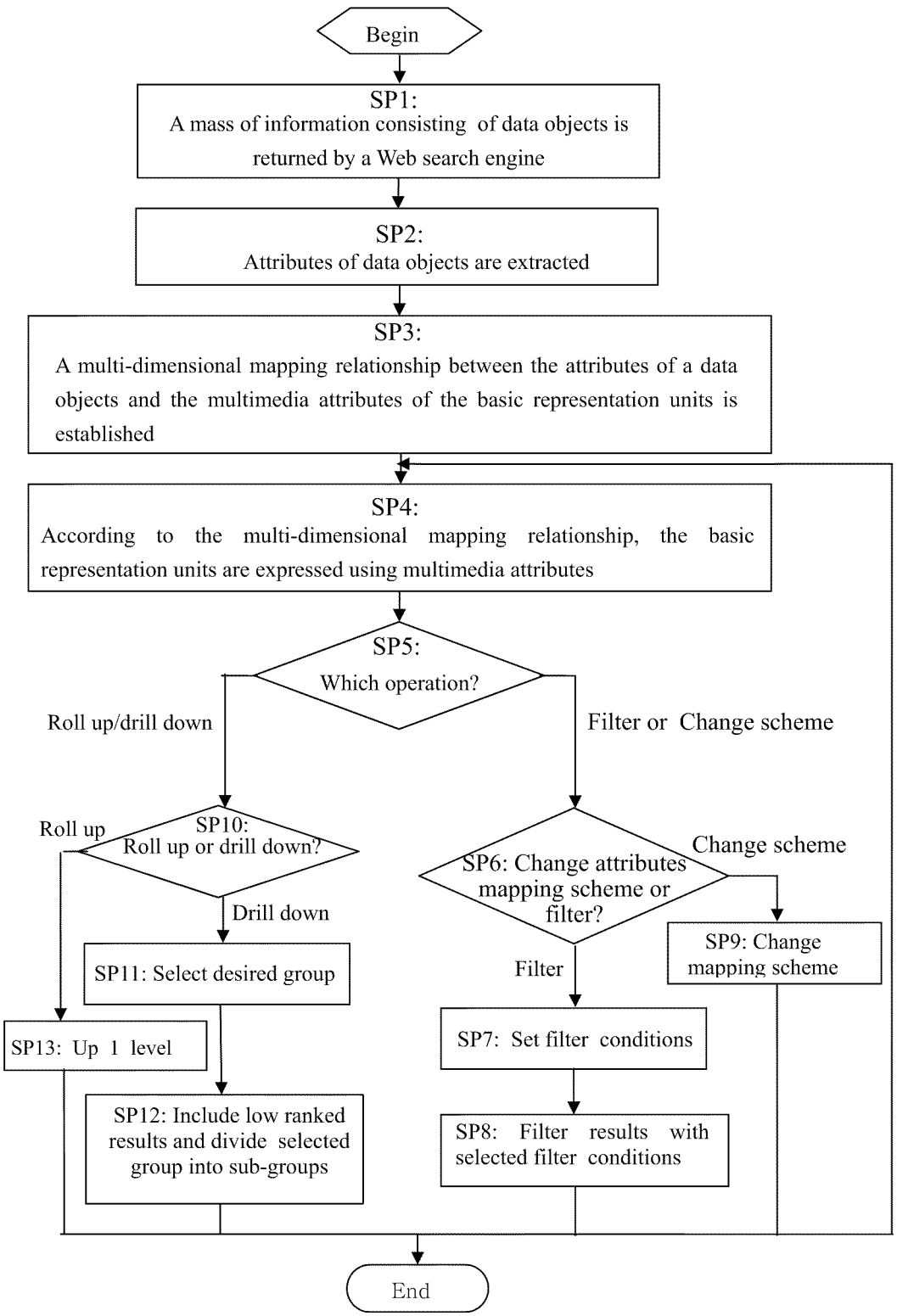
FIG. 3A is an exemplary flowchart illustrating a multi-dimensional, comprehensive expression method.

FIG. 3A is an exemplary flowchart illustrating a multi-dimensional, comprehensive expression method that can provide a plurality of interactive techniques to permit users to rapidly browse and/or find specific results. In some embodiments, such multi-dimensional, comprehensive expression methods may provide a plurality of interactive displays for the user to rapidly browse and/or find results.

The steps SP1-SP4 of the exemplary multi-dimensional, comprehensive expression method in FIG. 3A are similar to corresponding steps in FIG. 1, therefore the descriptions for these steps are omitted.

Step SP5 permits selection of one of three different interactive operation options: "change mapping", "filter" and "roll up/drill down".

If filter is selected in step SP6, then for the "filter" interactive operation, in step SP7, the user can input information filter criteria to narrow down or enlarge the expressed range of information content. In step SP8, the may be applied to filter out the data objects not meeting the criteria and keep the data objects meeting the criteria and help the user rapidly lock on to the desired result. The filter criteria can be a certain data object attribute or any logical combination of a plurality of data object attributes. For example, a user may choose to display only data objects containing the keyword "computer", from sites with the domain "edu", and are in the PDF format and hide all the other documents.

On the one hand, the user can set a physical/logical attribute or a combination of a plurality of data object attributes as filter criteria to narrow down one time or multiple times the expressed range of content to lock on to the content that the user is really interested in.

On the other hand, if the filter criteria set by the user is too severe to get desired information, the user may adjust the filter criteria or modify the filter criteria to get the proper range of information content.

For example, in the "catamount" example, if "large catamount" is set as the filter criterion, the returned data objects about "large catamount" such as tiger, leopard are displayed; Further, if the settings are narrowed to "tiger" and "years 2000-2007" as the filter criteria, then the returned data objects that correspond to "tiger" and issued during the period from 2000-2007 are expressed.

If the filter criterion "years 2000-2007" is removed, then all the returned data objects about "tiger" are expressed.

If the "change mapping" interactive operation is selected in step SP6, then, in step SP9, users can change and customize mapping relationships between data object attributes and the attributes of the basic representation units, according to their preferences. For example, suppose the current mapping scheme is set so that: "domain" is mapped to "color", "relevancy" is mapped to "block size", "location" is mapped to "block shading", "document format" is mapped to "icons", "time" is mapped to "sound" and so on. Users can change the current mapping scheme to any other schemes to, for example, "domain" can be mapped to "block shading", "location" to "color", "document size" to "block size", "time" to "rhythm of sound" and so on. Such mapping changes can help to have highlight search results based on user preferences.

If "roll up/drill down" is selected in step SP5, then, in step SP10, the user may further narrow choices by selecting either "drill down" or "roll up". In step SP11, the user may select a group and use the "drill down" operation to enter a lower level of a hierarchical data object structure. In step SP12, more details of the selected level of hierarchy resulting from using the drill down function are shown. If roll up is selected in step SP10, then, in step SP13, the user may move up one level in the hierarchy.

Figure 3B:
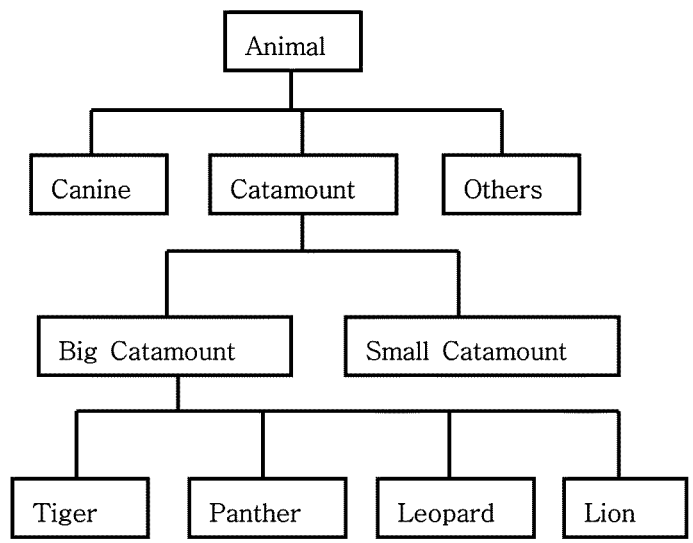
FIG. 3B shows an example of a hierarchical group structure based on document theme for a search query for the term "animal".

As shown in FIG. 3B, for the search results of query "animal" for example, all the search results are classified into hierarchical groups 300 based on the theme. For example, if users are browsing at the level of "big catamount", which has four subgroups, "tiger", "panther", "leopard", and "lion," then, if the user wants to learn more about the subgroup "tiger", the user can use the "drill down" function to enter the "tiger" level. Through interactive tools, a user can modify settings to customize his or her desired attribute associations.

Figure 4A:
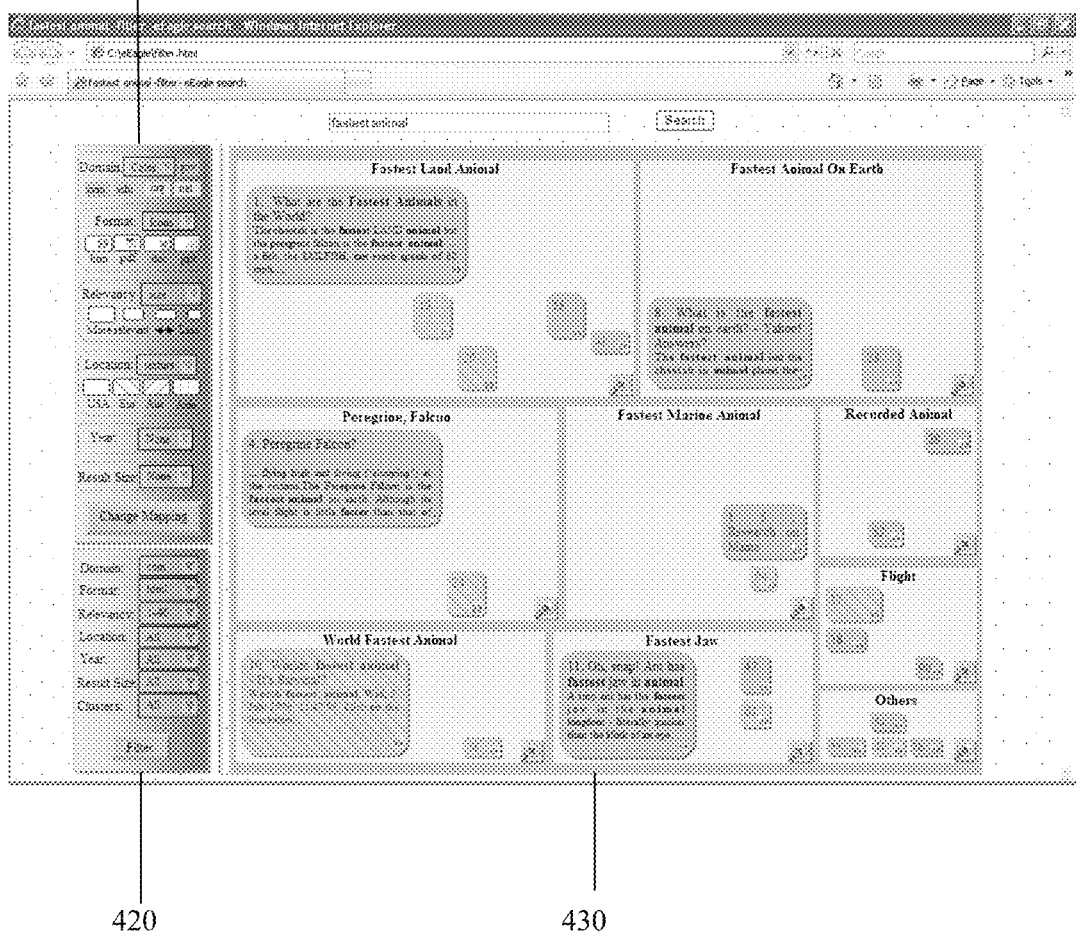

FIG. 4A-4B show examples of an expression interface obtained using the exemplary multi-dimensional, comprehensive expression method in FIG. 3A. The "change mapping" operation is done through "change mapping" control panel 410, located at the upper-left corner of the interface in FIG. 4A. In some embodiments, all the current mapping relationships between data objects and blocks (basic representation units) are shown on "change mapping" control panel 410.

As shown in FIGS. 4A and 4B, "filter" control panel 420 appears on the bottom-left corner of the interface. Any combination of the listed "conditions" (i.e. data objects attributes) can be set through the "filter" control. FIG. 4A indicates such criteria of the filter: "com" for the attribute of "domain", "html" for the attribute of "document format", "1~90" for the attribute "relevancy", "all" for the attribute "location", "all" for "year" (publication date), "all" for attribute "result size", and "all" for attribute "clusters" (classifications or groups). These conditions indicate that search results that are from the "com" domain, with the "html" format, and with a relevancy score between one and ninety are expressed. All others are filtered out and not displayed. The filter result 430, which may include multiple blocks, is shown in FIG. 4A.

FIG. 4B is an exemplary expression interface obtained by drilling down from FIG. 2B and selecting the cluster "fastest land animal", by clicking the "drill down" button 260 located at the right-bottom corner of the cluster "fastest land animal". As shown, the cluster "fastest land animal" from FIG. 2B has been detailed in FIG. 4B and further divided into several subgroups named "zoo", "blog", "video", and so on. By clicking on the "roll up" button 440 in FIG. 4B, the interface will roll up from FIG. 4B to FIG. 2B.

Figure 5:
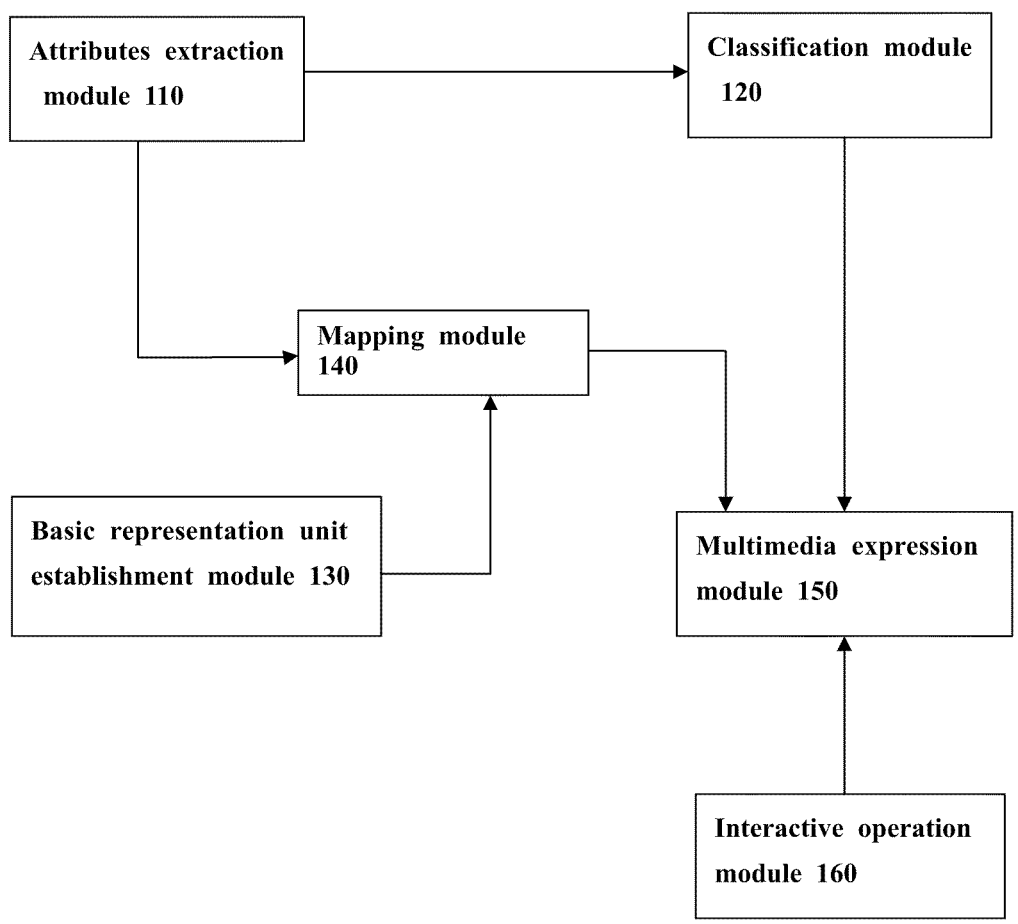
FIG. 5 is a block diagram illustrating an exemplary configuration of a multi-dimensional comprehensive expression apparatus for data objects.
Figure 6:
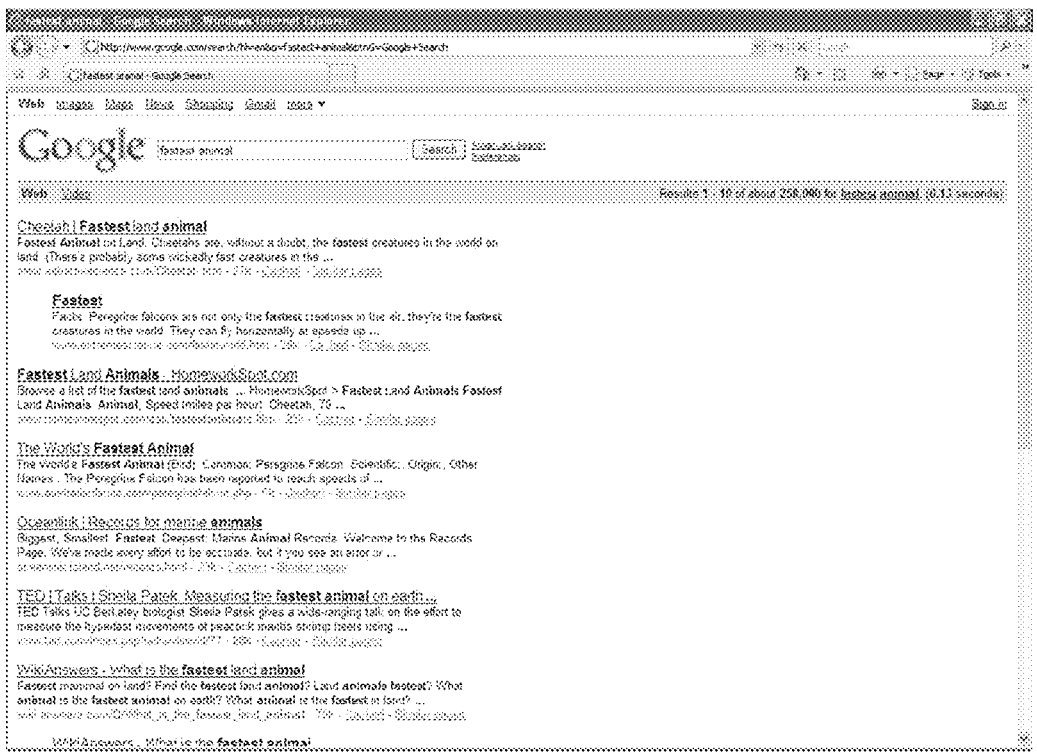
FIG. 6 is an example of the expression interface for the returned search results by the conventional Web search engine Google.

FIG. 5 is a block diagram illustrating an exemplary configuration of a multi-dimensional, comprehensive expression apparatus.

In some embodiments, a multi-dimensional, comprehensive expression apparatus 100 may comprise attribute extraction module 110, classification module 120, basic representation unit establishment module 130, mapping module 140, and multimedia expression module 150.

In some embodiments, Attribute extraction module 110 can receive as input a mass of information, which may comprise data objects with associated physical attributes and logical attributes. In some embodiments, the input data objects may be returned by a Web search engine, and associated attributes may be extracted from the data objects.

In some embodiments, Classification module 120 can classify data objects according to physical or logical attributes extracted by attribute extraction module 110.

In some embodiments, Basic representation unit establishment module 130 can establish the geometry of the basic representation units and associate the basic representation units with multimedia attributes.

In some embodiments, Mapping module 140 can map different multimedia attributes of a basic representation unit to the attributes of a data object based on user preferences or based on a default predetermined mapping association.

In some embodiments, multimedia expression module 150 expresses the basic representation unit by displaying it on the screen of the computer and/or playing audio data through speakers or other audio output devices, to reflect the attribute classification data objects. Accordingly, multimedia attributes corresponding to the attributes of data objects are rendered based on the multi-dimensional mapping relationship between the attributes of data objects and the multimedia attributes of the basic representation units.

In some embodiments, the blocks representing a plurality of data objects can be tightly placed on the expression interface to optimally utilize the space available and to express the corresponding mass of viewable correlative information and attributes of the data objects.

The multi-dimensional, comprehensive expression apparatus according to the present invention takes advantage of the basic representation unit with its multimedia attributes to intuitively express structural relationships between data objects, by using the hierarchical classification structure of information. Therefore, multi-dimensional, comprehensive expression methods, consistent with disclosed embodiments, may provide a large capacity for information expression relative to screen size: for example, the relationships between hundreds of documents can be clearly expressed on an 800× 600 pixel screen. Not only can this capacity enhance the speed by which a user conducts searches and grasps general information pertaining to the searched data objects, it can enable a user to understand the structure of the field of knowledge.

Furthermore, in some embodiments, the multi-dimensional, comprehensive expression apparatus 100 may further comprise interactive operation module 160 for receiving users' interactive operations including "change mapping", "drill down/roll up", and "filter". With these interactive operations, users can easily highlight and make stand out the desired data objects from others.

As would be apparent to one of ordinary skill in the art, there are other types of interactive modules that may be used. As one example, interactive module 160 may even provide an expression interface platform for a user to customize an interface by selecting different combinations of visual and aural elements according to his/her interests and needs. This can significantly improve a user's experience, as well as increase flexibility and maintain the user's interest.

The multi-dimensional, comprehensive expression method and apparatus and a visualized human computer interactive expression interface thereof further provide the ability for a user to group (including classify or cluster) the data objects and express more desired results. Suppose the user selects a class, more results with lower ranks will be included. Then the selected class will be further divided into subclasses, zoomed in and expressed on the interface. In this manner, even documents that are ranked in the hundreds can be easily discovered.

The multi-dimensional, comprehensive expression method and apparatus and a viewable human computer interactive expression interface thereof further provide the function of rapidly expressing more information about the documents, though not the documents themselves. For example, when a user moves a mouse over a block, the screen can express such detailed information about the represented document as a snippet or a snapshot of the web page.

Although some embodiments of the present invention have been shown and described, the descriptions are for illustrative purposes only and not intended to limit scope. Instead, it would be appreciated by those of ordinary skill skilled in the art that changes may be made to these embodiments without departing from the principles and spirit of the invention, the scope of which is defined by the following claims and their equivalents.

Embodiments described provide a multi-dimensional, comprehensive expression method and apparatus for expressing a mass of viewable correlative information and the attribute information of said mass of viewable correlative information, and a multimedia, visualized human computer interactive expression interface thereof, which are based on the classification of said mass of information and which adopt multi-dimensional and multimedia video and audio technique

The invention claimed is:

1. A computer-implemented method for expressing information comprising the steps of:
   extracting attributes of a plurality of data objects, wherein the attributes reflect information associated with the data objects;
   hierarchically grouping the data objects based on the attributes of the data objects to form a hierarchical structure;
   establishing basic representation units, wherein the basic representation units include multimedia attributes and each basic representation unit corresponds to at least one data object;
   establishing a mapping relationship between distinct attributes of the data objects and the multimedia attributes of the basic representation units;
   displaying the basic representation units to reflect the hierarchical grouping of the data objects on a multimedia device, wherein the mapping relationship is used to determine the multimedia attributes of the displayed basic representation units; and
   providing a group of interactive operations to permit interaction with the displayed basic representation units, wherein the interactive operations comprise:
      changing the mapping relationship between attributes of the data objects and the multimedia attributes of the basic representation units;
      filtering to screen data objects according to specified filtering criteria; and
      drilling down to a lower level of the hierarchical structure or rolling up to higher level of the hierarchical structure, wherein the drilling down and rolling up functions adjust the scope of data object expression.

2. The method of claim 1, wherein the attributes of the data objects comprise physical attributes and logical attributes and the hierarchical grouping of data objects is obtained by classifying the data objects according to their physical attributes or logical attributes.

3. The method of claim 1, wherein the multimedia attribute of a basic representation unit includes at least one of visual attributes or aural attributes.

4. The method of claim 3, wherein,
   the visual attributes of the basic representation unit include position, size, color, shape, intensity, texture, animation, shading, three-dimensional effect, and the text attribute on the basic representation unit; and
   the aural attributes of the basic representation unit include tone, volume, rhythm, melody, and the content of the tune.

5. The method of claim 1, wherein the basic representation unit is a geometry block.

6. A multi-dimensional comprehensive expression apparatus comprising a computer coupled to a multimedia device, the computer further comprising:
   an attribute extraction module for extracting attributes of a plurality of data objects, wherein the attributes reflect information associated with the data objects;
   a grouping module for hierarchically grouping the data objects based on the attributes of the data objects to form a hierarchical structure;
   a basic representation unit establishment module for establishing basic representation units, wherein the basic representation units include multimedia attributes and each basic representation unit corresponds to at least one data object;

a mapping module for establishing a mapping relationship between distinct attributes of the data objects and the multimedia attributes of the basic representation units;

an expression module, which displays the basic representation units to reflect the hierarchical grouping of the data objects on the multimedia device, wherein the mapping relationship is used to determine the multimedia attributes of the displayed basic representation units; and a user-interaction module that permits interaction with the displayed basic representation units, the user-interaction module further comprising:

a change mapping module that facilitates changing the mapping relationship between attributes of the data objects and the multimedia attributes of the basic representation units;

a filtering module that facilitates filtering to screen data objects according to specified filtering criteria; and a drilling down and rolling up module that facilitates drilling down to a lower level of the hierarchical structure of data objects or rolling up to a higher level to adjust the scope of data object expression.

7. The apparatus of claim 6, wherein the attributes of the data objects comprise physical and logical attributes and the data objects are classified according to their physical attributes or logical attributes.

8. The apparatus of claim 6, wherein, the multimedia attributes of a basic representation unit include visual attributes and aural attributes.

9. The apparatus of claim 8, wherein, the visual attributes of the basic representation unit include: position, size, color, shape, intensity, texture, animation, shading, three-dimensional effect, and the text attribute on the basic representation unit; and the aural attributes of the basic representation unit include: tone, volume, rhythm, melody, and the content of the tune.

10. The apparatus of claim 6, wherein, the plurality of data objects reflecting information are provided by a Web search engine.

11. A computer-implemented expression interface for displaying a plurality of structured data objects on a multi-media device, the expression interface comprising:

basic representation units with multimedia attributes capable of being tightly placed and displayed on the expression interface, wherein, the basic representation units are displayed to reflect the structure of the data objects and displayed based on a mapping relationship, wherein the mapping relationship associates attributes of the data objects with multimedia attributes of the basic representation, units; and at least one interactive panel for displaying and changing multimedia attributes of the basic representation units, wherein the at least one interactive panel further comprises:

at least one interactive panel to change display scope according to specified filter conditions;

at least one interactive panel to change the mapping relationship between attributes of the data objects and attributes of the basic representation units;

at least one interactive panel to screen data objects according to specified filtering criteria; and at least one interactive panel for drilling down to a lower level of the said hierarchical structure of data objects, or for rolling up to a higher level to adjust the scope of data object expression.

12. The expression interface of claim 11, wherein the multimedia attribute of a basic representation unit includes visual attributes and aural attributes.

13. The expression interface of claim 11, wherein, the mapping of different multimedia attributes of the basic representation unit to the attributes of a data object can be modified based on user preferences or based on a default predetermined mapping association.

* * * * *